United States Patent

Rollins

[15] 3,651,404

[45] Mar. 21, 1972

[54] VOICE PRIVACY ADAPTER

[72] Inventor: Thomas J. Rollins, Arlington Heights, Ill.

[73] Assignee: Motorola, Inc., Franklin Park, Ill.

[22] Filed: Jan. 12, 1970

[21] Appl. No.: 2,238

[52] U.S. Cl. ......................... 325/32, 179/1.5 R, 179/1.5 FS, 325/122, 332/43 B

[51] Int. Cl. ........................................................ H04k 1/00

[58] Field of Search ................325/32, 122; 179/1.5; 332/44, 332/43 B; 330/14; 333/76

[56] References Cited

UNITED STATES PATENTS

| | | | |
|---|---|---|---|
| 3,229,230 | 1/1966 | Feldman | 332/43 B |
| 2,206,590 | 7/1940 | Webb, Jr. | 179/1.5 |
| 3,249,897 | 5/1966 | Trilling | 330/14 X |

OTHER PUBLICATIONS

Reference Data for Radio Engineers, Fifth Edition, Pub. by Howard W. Sams Inc., pp. 7- 17 to 7- 19, and p. 17- 13.

*Primary Examiner*—Rodney D. Bennett, Jr.
*Assistant Examiner*—H. A. Birmiel
*Attorney*—Mueller, Aichele & Rauner

[57] ABSTRACT

A voice privacy adapter inverts the order of frequencies in a band of frequencies transmitted by radio to prevent unauthorized reception. The adapter includes an input circuit for selecting signals from one of either a transmitter or receiver in a two-way radio. A balanced modulator-chopper heterodynes the modulation signal with signals from a bistable multivibrator which is driven by an oscillator to produce a double sideband, suppressed carrier signal. The upper sideband is attenuated and the lower sideband is coupled to either the transmitter or receiver. The inversion of the signal at the transmitter followed by a second inversion at the receiver restores the modulation signal. Use of the balanced modulator-chopper eliminates all of the frequency components of the modulation signal thereby insuring privacy. The balanced modulator-chopper may be easily disabled allowing use of the radio without frequency inversion.

15 Claims, 5 Drawing Figures

INVENTOR
THOMAS J. ROLLINS
BY
Mueller, Aichele & Rauner
ATTYS.

INVENTOR
THOMAS J. ROLLINS
BY Mueller, Aichele & Rauner
ATTYS.

VOICE PRIVACY ADAPTER

BACKGROUND OF THE INVENTION

In two-way radio communications systems, it is often desirable to render a radio message unintelligible thereby preventing undesired parties from intercepting and understanding the message. Radio systems having this capability are particularly important to law enforcement agencies where an intercepted and understood message can prevent the apprehension of a criminal. One type of system which renders a transmitted message unintelligible is commonly known as a frequency inversion system. In this system an audio signal, received at a transmitter microphone, is coupled to a voice privacy adapter where it is heterodyned in a balanced modulator with a signal from a local oscillator to produce two sidebands of signals, an upper and a lower sideband, spaced symmetrically around the local oscillator frequency. The distance of the sideband signals from the local oscillator frequency is equal to the frequency of the audio signal. The original signal is then said to be inverted in frequency about the oscillator frequency. The upper sideband is attenuated in a low-pass filter and the remaining lower sideband signal is coupled to a radio transmitter where it is processed and transmitted by means well known in the art. At the receiving station the inverted signal is coupled to a second voice privacy adapter which performs the same functions as performed at the transmitting end. This second inversion of the original signal and subsequent filtering in the voice privacy adapter, reproduces the original audio signal, which is then coupled to an audio amplifier and speaker for reproduction as audible intelligence.

One problem with such a system is that when an audio signal is heterodyned with a signal from an oscillator, the original audio frequencies are produced in addition to the upper and lower sidebands spaced on each side of the oscillator frequency. Although substantially lower in amplitude than the original audio signals and the sideband signals, these audio frequencies are capable of being understood if transmitted and received by equipment that does not have a frequency inverter, to thereby defeat the purpose of the privacy system.

Another problem is that many radio communication systems transmit coded tones in addition to the audio message for activating selected receivers. This allows a number of communications systems to share one channel without each system being required to listen to the other system's messages. The coded tone normally transmitted, is in the range of 100 to 200 Hz. The decoder used for activating the selected receiver must be located in the receiver circuitry prior to frequency inversion by the voice privacy adapter. At the transmitter the tone must therefore bypass the voice privacy adapter and be applied directly to the transmitter. When the tone is coupled to the voice privacy adapter at the receiver, it will be inverted in frequency to produce an audible, high frequency tone which is objectionable when coupled to the receiver speaker.

In radio systems employing a coded tone the transmitter is allowed to remain on a short period of time after the transmission is terminated in order to quickly deactivate the decoder in the receiver. If the voice privacy adapter is operated in both a receive and transmit mode, and is allowed to revert to its receive mode before the transmitter is deactivated, a feedback squeal will be transmitted to the selected receivers. This feedback signal is objectionable to system users.

Another problem commonly encountered in such systems is that when a weak signal is received, high frequency noise produced in the first stages of a frequency modulation receiver increases. When coupled to the receiver audio sections, this noise is attenuated due to the high frequency attenuation characteristics required in the receiver audio designs. If the high frequency noise is coupled to a voice privacy adapter, it will be inverted to produce a low frequency noise which is not easily attenuated in the receiver audio amplifier. To eliminate the apparent degradation in receiver sensitivity due to the increased low frequency noise, voice privacy adapters have been supplied with an amplifier and speaker to be used in place of the receiver amplifier and speaker. This extra amplifier and speaker has an audio attenuation characteristic which compensates for the increased low frequency noise. However this requires duplication of components resulting in extra cost.

In order to eliminate the necessity of modifying an existing two-way radio unit, some voice privacy adapters are connected directly to the receiver speaker. When the received signal is first amplified in the voice privacy adapter, the resultant audio signal is substantially distorted due to the distortion characteristics of both the receiver audio amplifier and the voice privacy adapter. This is undesirable.

SUMMARY OF THE INVENTION

It is, therefore, an object of this invention to provide an improved voice privacy adapter for a two-way radio.

Another object of this invention is to provide an improved voice privacy adapter wherein the original audio frequency signal is substantially eliminated from the transmitted message.

Yet another object of this invention is to provide an improved voice privacy adapter which may be used in conjunction with a two-way radio communications system employing coded tone transmission.

A further object of this invention is to provide a voice privacy adapter for use in a two-way radio communication system employing coded tone transmission wherein the coded tone is substantially eliminated from the receiver audio.

A still further object of this invention is to provide a voice privacy adapter which may be added to a two-way radio without substantial modification of the radio, and which does not require a separate audio amplifier and speaker.

Another object of this invention is to provide a voice privacy adapter which does not decrease the sensitivity of a two-way radio to which it is attached.

Yet another object of this invention is to provide a voice privacy adapter for a two-way radio without increasing the distortion of the received message.

A further object of this invention is to provide a voice privacy adapter which can be adapted to use in a coded tone radio communications system without producing a feedback signal at the termination of a transmitted message.

In practicing this invention a voice privacy adapter is provided wherein the audio or modulation signal in a radio transmitter or receiver is inverted in frequency. Signals from the transmitter microphone or receiver discriminator are coupled to an input circuit of the voice privacy adapter. Switching transistors in the input circuit select either the transmitter or receiver path of the input circuit. The switching transistors are controlled by a gating circuit. The switch in the receiver path is normally ON and the switch in the transmitter path is normally OFF. If the transmitter path has been selected, timing circuitry in the gating circuit will hold the switch in the transmitter path "ON" for a period of time after termination of the message and until after the transmitter turns off. This will prevent feedback signals from being heard at the other receivers in the system. These feedback signals are caused by the receiver output being coupled to the transmitter modulator through the voice privacy adapter. Two filter circuits are included in the receiver path of the input circuit. The first filter attenuates a transmitted coded tone thereby preventing frequency inversion of the tone and a resultant undesired high frequency tone at the speaker. The second filter attenuates high frequency noise produced in the first stages of the receiver as the receiver is quieted. This prevents frequency inversion of the receiver noise and a resulting decrease in receiver sensitivity.

From the input circuit of the voice privacy adapter the signals are coupled to a balanced modulator which includes a differential phase splitter, a pair of modulator-choppers and summer. The signal is divided into two paths by the differential phase splitter with the signals in one path being 180° out of phase with signals in the other. The modulator-choppers are coupled to the first and second path and are alternately turned "ON" and "OFF" at a 3.5 kHz. rate modulating and chopping the incoming signals. A bistable driven by an oscillator operating at 7 kHz. actuates the choppers. The signals in the first and second path are then summed to produce an upper and lower sideband of signals equally spaced around a 3.5 kHz. center frequency, with the spacing determined by the frequency of the original signal. The method of alternate chopping of the first and second path and then combining yields a lower sideband signal which is inverted in frequency from the original signal, and does not include any components of the original signal. The upper and lower sideband signals are then coupled to a multisection active filter which substantially eliminates the upper sideband signals without affecting the lower sideband signals. The lower sideband signal is then coupled to an output circuit where it is coupled to either the transmitter input circuits or the receiver audio amplifier.

DESCRIPTION OF THE PREFERRED EMBODIMENT

Figure 1:
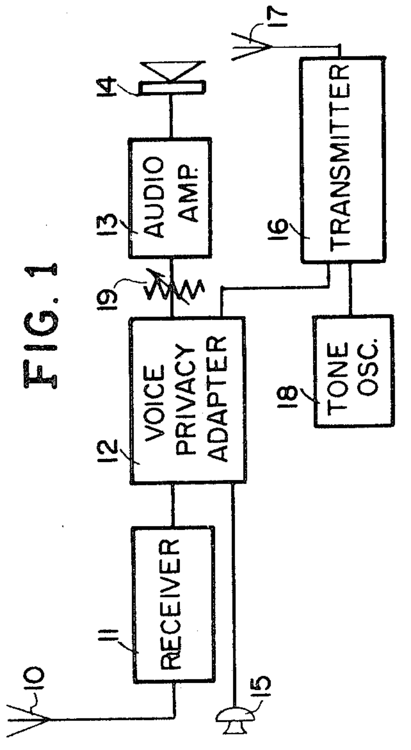
FIG. 1 is a block diagram of a two-way radio including the voice privacy adapter of this invention.

FIG. 1 illustrates a two-way radio wherein audio signals picked up by microphone 15 are coupled to voice privacy adapter 12 where they are processed to produce a spectrum of frequencies spaced from a 3.5 kHz. modulating frequency by the original signal frequency. The output of voice privacy adapter 12 then contains a spectrum of frequencies corresponding to the original signals, but the relative positions of high and low frequencies in the spectrum have been exchanged or inverted. The inverted signals are then coupled to transmitter 16 where they are processed in a manner well known in the art to produce radio frequency signals. The radio frequency signals are then radiated to the receiver by antenna 17.

When the two-way radio is used in the receiver mode a radio frequency signal, containing an audio message which is inverted in frequency, is received at antenna 10, and coupled to receiver 11 where it is processed in a manner well known in the art. Signals appearing at the discriminator in receiver 11 are coupled to the voice privacy adapter 12 where they are again inverted in frequency to produce the originally transmitted signals. The signals are then coupled to receiver audio amplifier 13 for amplification, and then to a suitable audio processor such as speaker 14 for reproduction as an audible signal.

In systems employing coded tones for receiver selection, the desired coded tone is coupled from tone oscillator 18 to transmitter 16 where it is processed in a manner well known in the art to produce radio frequency signals. The radio frequency signal is radiated to the selected receiver by antenna 17.

Two-way radios commonly have the receiver volume control 19 inserted prior to the audio amplifier 13. Speaker 14, receiver volume control 19 and the transmitter microphone 14 are separate from the remainder of the radio. Insertion of the voice privacy adapter 12 between receiver 11 and the receiver volume control 19 and between microphone 14 and transmitter 16 will therefore, require only a rerouting of wires and not a substantial modification to the two-way radio.

Figure 2:
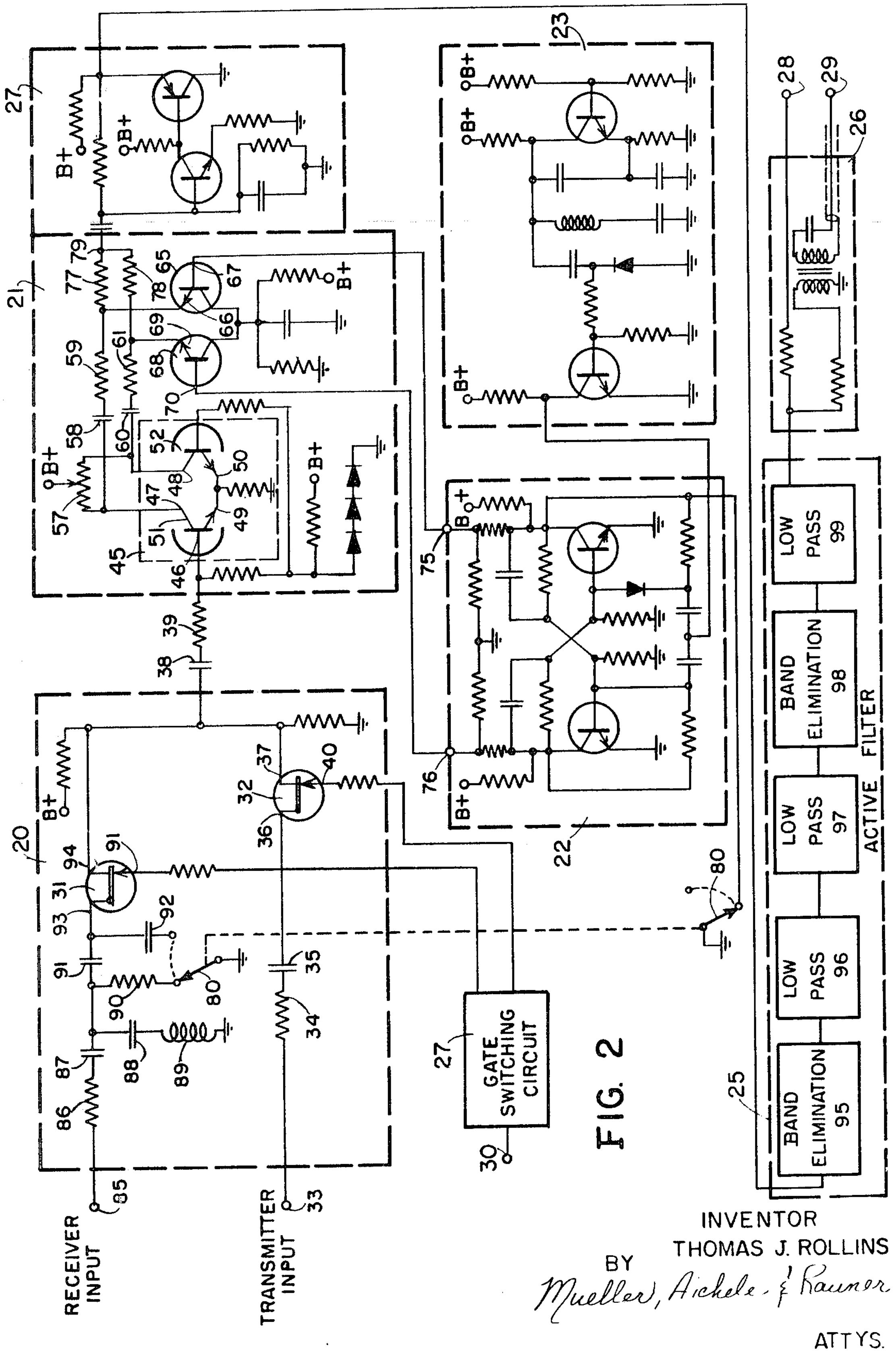
FIG. 2 is a partial block diagram and partial schematic of the voice privacy adapter of this invention.

FIG. 2 illustrates the voice privacy adapter illustrated by the block 12 in FIG. 1. This adapter includes an input circuit 20 for receiving audio signals from the microphone applied at terminal 33, and audio signals from the receiver applied at terminal 85. When the two-way radio is operated in the receiver mode, field effect transistor (FET) 31 in input circuit 20 is saturated and FET 32 is in cutoff condition. When transmitter 16 is energized, a signal coupled from transmitter 16 to input 30 of gate switching circuit 27 produces a signal at gates 40 and 41 of FETs 32 and 31 respectively which causes FET 31 to change from saturation to cutoff, and FET 32 to change from cutoff condition to saturation. Audio signals from microphone 15 (FIG. 1) applied to transmitter input 33 of input circuit 20 are coupled through isolation resistor 34 and DC blocking capacitor 35 to source 36 of FET 32. With FET 32 in saturation the signals are coupled from drain 37 of FET 32, through DC blocking capacitor 38, and isolation resistor 39, to balanced modulator-chopper 21.

In balanced modulator-chopper 21, the signals are coupled to base 46 of transistor 51 in differential phase splitter 45. Differential phase splitter 45 comprises transistors 51 and 52 which have identical characteristics. Signals entering base 46 of transistor 47 in differential phase splitter 45 are divided into two paths. A portion of the signal is coupled to collector 47 in transistor 51. The remaining portion of the signals appearing at base 46 of transistor 51 is coupled from emitter 49 of transistor 51 to emitter 50 of transistor 52. Signals entering emitter 50 of transistor 52 are shifted 180*L* in phase and coupled to collector 48 of transistor 52. Potentiometer 57, coupled to collectors 47 and 48 of transistors 51 and 52 respectively, allows the signal levels appearing at the two collectors to be adjusted to the same amplitude.

The signals from the collectors 47 and 48 of the transistors 51 and 52 are applied to a balanced modulator-chopper which includes transistors 65 and 68. Signals appearing at collector 47 of transistor 51 are coupled through DC blocking capacitor 58 and signal dividing resistor 59 to emitter 66 of transistor 65. Signals appearing at collector 48 of transistor 52 are coupled through DC blocking capacitor 60 and signal dividing resistor 61 to emitter 69 of transistor 68.

Switching signals are applied to the transistors 65 and 68 of the modulator-chopper by the bistable 22. The bistable 22 is triggered by oscillator 23 which is a Clapp, series tuned oscillator which produces a 7 kHz. output signal. The signal from oscillator 23 coupled to bistable 22 causes it to produce 3.5 kHz. square wave signals at outputs 75 and 76. The signals at outputs 75 and 76 of bistable 22 are 180° out of phase. Signals appearing at outputs 75 and 76 of bistable 22 are coupled to bases 67 and 70 respectively, of transistors 65 and 68, causing them to alternately switch from saturation to cutoff.

The alternate switching from saturation to cutoff condition of transistors 65 and 68 forming the modulator-chopper at a 3.5 kHz. rate modulates the signals appearing at emitters 66 and 69 of transistor 65 and 68 with a 3.5 kHz. signal.

Figure 3:
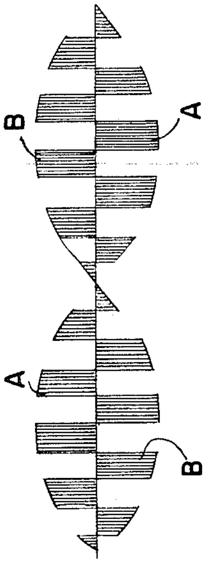
FIG. 3 is a representation of the wave form present at the output of the balanced modulator-chopper.

Referring now to FIG. 3, waveform A is a representation of the waveform at emitter 66 of transistor 65. Waveform B is a representation of the waveform appearing at emitter 69 of transistor 68. Signals appearing at emitter 66 of transistor 65 are coupled through signal dividing resistor 77 to point 79, and signals appearing at emitter 69 of transistor 68 are coupled through signal dividing resistor 78 to point 79. The two signals are summed at point 79 to produce the resultant waveform shown in FIG. 3.

The signal produced at summing point 79 is a double sideband, suppressed carrier signal centered about 3.5 kHz. The sidebands are spaced from the 3.5 kHz. reference by a distance equal to the frequency of the original signal. The technique of alternately modulating and chopping a signal and alternately modulating and chopping another signal 180° out of phase with the first, then summing the two signals, produces the combined signal, shown in FIG. 3. The average value of this combined signal is zero. The zero average value indicates that the audio signal, represented by the envelope of waveform A in FIG. 3, will not be transmitted along with the sideband signals developed at summing point 79 and represented by waveforms A and B. The sideband signals at summing point 79 are coupled to amplifier 27 where they are amplified and coupled to active filter 25.

Active filter 25 attenuates the upper sideband signals and passes the lower sideband signals without any attenuation. Filter 25 consists of two band elimination filter sections 95 and 98, and three low-pass filter sections 96, 97 and 99 whose individual responses are tailored such that the composite filter response has a low loss, flat passband from zero to approximately 3.5 kHz. and very sharp signal attenuation over 3.5 kHz.

Figure 4:
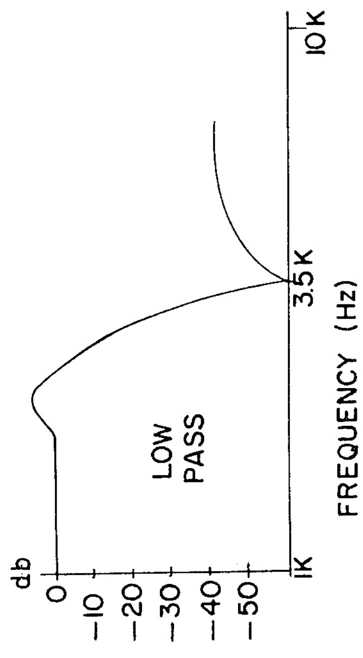
FIG. 4 is a graph showing the attenuation characteristic of a low-pass filter section of the active filter.

FIG. 4 is a graph representing the characteristics of the low-pass filter section 96, 97 and 99.

Figure 5:
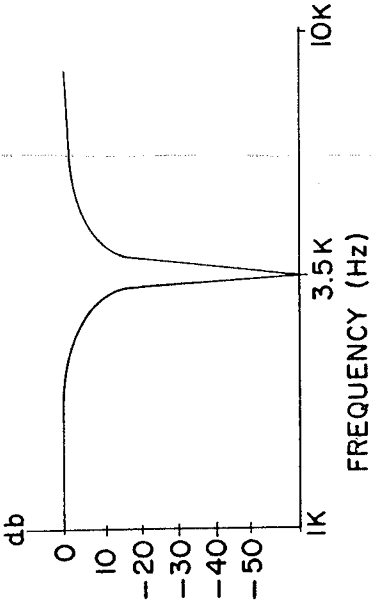
FIG. 5 is a graph showing the attenuation characteristic of a band elimination filter section of the active filter.

FIG. 5 is a graph representing the characteristics of the band elimination filter section 95 and 98.

The individual sections of the filter are arranged in an order which maximizes the allowable passband signal amplitude for the available supply voltage. As shown in FIG. 4, the low-pass filter sections exhibit a slight gain in the upper portions of the passband To prevent this gain characteristic from causing distortion of the signals, a band elimination filter section 95, which exhibits attenuation at approximately the same frequency at which the low-pass filter section exhibits gain, precedes the first two low-pass filter sections 96 and 97. A second band elimination filter section 98 is inserted as the fourth section of active filter 25, again to reduce amplitude at the frequencies at which the low-pass filter section exhibits gain, and in order to allow the last section in the active filter to be a low-pass filter section. A low-pass filter section is desirable as the last section of active filter 25 because the low output impedance characteristic of the low-pass filter section allows much greater power to be delivered to the low impedance input of the receiver audio amplifier.

The remaining low sideband signals are coupled from active filter 25 to output circuit 26. Output 28 of output circuit 26 couples the frequency inverted signal to transmitter 16.

In the receiver mode of operation, a radio frequency signal comprising a frequency inverted signal is received by antenna 10 and processed in a manner well known in the art in receiver 11 (FIG. 1). The resulting frequency inverted signal is coupled from the discriminator of receiver 11 to input 85 of input circuit 20 in voice privacy adapter 12 (FIG. 2). The signals are coupled through isolation resistor 86 to a filter includes capacitors 87 and 88 and inductor 89 which attenuates any coded tones that may be present in the input signal in addition to the frequency inverted signals. This prevents the voice privacy adapter from processing a low frequency coded tone to produce a high frequency tone at the receiver speaker 14.

Signals received at antenna 10 (FIG. 1) are coupled to receiver 11. When weak signals are received by receiver 11 the noise produced in the first stages of receiver 11 begins to disappear or "quiet". The noise components in the lower portion of the audio spectrum (1,000 Hz.) disappear before those in the upper portion of the audio spectrum (3,000 Hz.). The resulting high frequency noise is coupled to input 85 (FIG. 2) of input circuit 20 in voice privacy adapter 12, along with the received frequency inverted signal. If processed by voice privacy adapter 12, and inverted in frequency, it would produce a low frequency noise at speaker 14. To overcome this low frequency noise at speaker 14, a stronger signal must be received at antenna 10 and coupled to receiver 11. The result, therefore, of this increased low frequency noise at speaker 14 is to produce an apparent decrease in sensitivity of receiver 11. When switch 80 in input circuit 20 is in the coded position capacitors 91 and 92 act as a high frequency filter to attenuate the high frequency noise produced in the first stages of the receiver. Removal of the high frequency noise produced in the first stages of the receiver, prior to frequency inversion, allows the voice privacy adapter to be used with audio amplifier 13 and speaker 14 without any apparent decrease in sensitivity of receiver 11.

The frequency inverted signals appearing at input 85 of input circuit 20 in voice privacy adapter 12 are coupled through capacitor 87 and capacitor 91 to source 93 of FET 31. With the two-way radio operated in its receiver mode, FET 31 is in a saturated condition allowing signal appearing at source 93 of FET 31 to be coupled to drain 94. Signals appearing at drain 94 of FET 31 are coupled through blocking capacitor 38 and isolation resistor 39 to the balanced modulator-chopper 21 where they are processed in a manner previously described. The resultant signals, appearing at summing point 79 in balanced modulator-chopper 21, consist of upper and lower sideband signals, equally spaced around a suppressed center frequency of 3.5 kHz. The lower sideband signals are identical in frequency to those originally coupled to the microphone of the sending transmitter. The upper and lower sideband signals appearing at summing point 79 are amplified in amplifier 27 and coupled to active filter 25 where the upper sideband signals are attenuated. The lower sideband signals are coupled from active filter 25 to output circuit 26. Output 29 of output circuit 26 couples the signals through volume control 19 to receiver audio amplifier 13. The signals are amplified in receiver audio amplifier 13 and coupled to speaker 14 for reproduction as audible intelligence identical to that originally transmitted.

To allow operation of the radio without frequency inversion of the signal, switch 80 is switched to its clear position thereby grounding output 75 of bistable 22. With output 75 at ground potential, transistor 65 is in a cutoff condition and output 76 of bistable 22 is forced to remain at supply potential. This causes transistor 68 to be maintained in a saturated condition. When transistor 68 is in a saturated condition, a low impedance path to ground potential is provided for signals appearing at emitter 69 of transistor 68. The signals appearing at emitter 66 of transistor 65 are coupled through resistor 67 to summing point 79 without being modulated by 3.5 kHz. square wave. The original signal will therefore remain unaltered and will be coupled through amplifier 27, low-pass filter 25, and output circuit 26 to the transmitter or receiver.

In the clear position the high frequency filter consisting of capacitors 91 and 92 is removed from input circuit 20. With the filter removed, the normal high frequency characteristic is provided for the receiver audio. Resistor 90 is inserted in the receiver path of input circuit 20 to compensate for the changed impedance when capacitor 92 is removed.

It can be seen, therefore, that voice privacy adapter is provided which is easily adapted for use in a two-way radio. A balanced modulator-chopper used in the voice privacy adapter is constructed in a manner that substantially eliminates components of the original signal from the frequency inverted sideband. Elimination of the original frequency components renders the transmitted message unintelligible without the use of an identical voice privacy adapter. The voice privacy adapter may be used in two-way radio systems employing tone coded signals. Additionally the voice privacy adapter may be used in two-way radio without a decrease in the receiver sensitivity and without the necessity of a separate audio amplifier and speaker. Use of a balanced modulator-chopper to provide the frequency inversion function allows use of the two-way radio for sending and receiving voice privacy messages, as well as messages which are not inverted in frequency, without removing or bypassing the voice privacy adapter.

I claim:

1. A voice privacy system for inverting the frequency order of a first band of signals including in combination, input means including first and second inputs for receiving said first band of signals, switch means coupled to said first and second inputs for selecting one of said first input and second input, and first filter means coupled to said first input for attenuating undesired signals in said first band of signals, phase splitter means coupled to said input means for dividing said first band of signals into first and second bands of signals with said second band of signals being the same as said first band of signals and changed in phase from said first band of signals by 180°, said phase splitter means having first and second outputs, first switching means coupled to said first output, second switching means coupled to said second output, first circuit means coupled to said first and second switching means for supplying a signal of a predetermined frequency thereto for alternately turning said first and second switching means on and off whereby said first and second bands of signals are alternately heterodyned with said signal of a predetermined frequency to produce third and fourth bands of signals, summing means coupled to said first and second outputs for adding said third and fourth bands of signals to produce a resultant band of signals including an upper and lower sideband of signals, and filter means coupled to said summing means for attenuating said upper sideband of signals in said resultant band of signals.

2. The voice privacy system of claim 1 further including switch means coupled to said first circuit means for inhibiting operation thereof, thereby allowing said first band of signals to pass unaltered through said phase splitter means, summing means, and filter means.

3. The voice privacy system of claim 1 wherein said phase splitter means includes first and second semiconductor means having base, emitter and collector electrodes, the emitter electrodes of said first and second semiconductor means being coupled together, said first band of signals being coupled from said input means to the base electrode of said first semiconductor means, said first semiconductor means coupling said first band of signals to the emitter and collector thereof, said second semiconductor means responsive to the first band of signals to produce said second band of signals at the collector of said second semiconductor means.

4. The voice privacy system of claim 3 wherein said phase splitter means further includes resistance means coupled from the collector of said first semiconductor means to the collector of said second semiconductor means for adjusting the amplitude of said first and second bands of signals.

5. The voice privacy system of claim 3 wherein said phase splitter means includes first and second semiconductor means have substantially similar semiconductor characteristics.

6. The voice privacy system of claim 1 wherein said filter means includes a plurality of filter sections, each having a particular frequency response and arranged in a predetermined order for providing maximum attenuation of said upper sidebands of signals of said resultant band of signals, and minimum attenuation of said lower sideband of signals of said resultant band of signals.

7. The voice privacy system of claim 6 wherein said filter means includes five active filter sections said first and fourth filter sections attenuating signals between two predetermined frequencies, with maximum attenuation at a first frequency, said second, third and fifth filter sections attenuating signals above said first frequency.

8. The voice privacy system of claim 6 wherein said filter means includes a plurality of said filter sections which attenuate signals above a first frequency and a plurality of said filter sections which attenuate signal between two predetermined frequencies having said first frequency therebetween.

9. The voice privacy system of claim 1 wherein said first circuit means includes an oscillator for producing a first frequency signal, second circuit means coupled to said oscillator and having first and second outputs, said second circuit means responsive to said first frequency signal to produce said signal of a predetermined frequency, said first output coupled to said first switching means and said second output coupled to said second switching means for coupling said signal of a predetermined frequency thereto. said first output, second switching means coupled to said second 10. The voice privacy system of claim 9 wherein said second circuit means is a bistable multivibrator.

11. The voice privacy system of claim 1 wherein said input means further includes second filter means coupled to said first input for attenuating a range of frequencies in said first band of signals.

12. In a two-way radio having a transmitter including a microphone, and a receiver including a discriminator and audio amplifier, a voice privacy adapter for inverting the order of the modulation frequencies including in combination, input means including a first input for receiving and selecting the modulation frequencies from the transmitter microphone and a second input for receiving and selecting the modulation frequencies from the receiver discriminator, switch means coupled to said first and said second inputs for selecting one of said first input and said second input, and first filter means coupled to said second input for attenuating undesired signals in said modulation frequencies, oscillator means having a predetermined frequency signal, balanced modulator-chopper means coupled to said input means and said oscillator means, said balanced modulator-chopper means developing first and second bands of frequencies from said modulation frequencies with said second band being the same as said first band and changed in phase from said first band of signals by 180°, said oscillator means coupling said predetermined frequency signal to said balanced modulator-chopper means, said first and second bands of frequencies and said predetermined frequency signal heterodyning in said balanced modulator-chopper means to produce a resultant signal including an upper and lower sideband of frequencies, the frequency order of said lower sideband of frequencies being the inverse in frequency order of said modulation frequencies and having substantially the same frequency limits, filter means coupled to said balanced modulator-chopper means for attenuating said upper sideband of frequencies, and output means for coupling said lower sideband of frequencies to one of the transmitter and the receiver audio amplifier.

13. The voice privacy adapter of claim 12 wherein said balanced modulator-chopper means includes, first circuit means coupled to said input means for receiving said modulation frequencies and developing therefrom a first and second band of frequencies, first and second switching means coupled to said input means, said first switching means alternately modulating said first band of frequencies with said predetermined frequency signal and attenuating said first band of frequencies, said second switching means alternately modulating said second band of frequencies with said predetermined frequency signal and attenuating said second band of frequencies, summing means coupled to said first and second switching means for combining said modulated and attenuated first and second bands of frequencies to develop therefrom said resultant signal.

14. The voice privacy adapter of claim 13 wherein said first circuit means includes first and second semiconductor means having base, emitter and collector electrodes, the emitter electrodes of said first and second semiconductor means being coupled together, said modulation frequencies being coupled from said input means to the base electrode of said first semiconductor means, said first semiconductor means coupling said modulation frequencies to the emitter, said first semiconductor means responsive to the modulation frequencies to produce said first band of frequencies at the collector of said first semiconductor means, said second semiconductor means responsive to the modulation frequencies to produce said second band of frequencies at the collector of said second semiconductor means.

15. The voice privacy adapter of claim 13 wherein said input means further includes second filter means coupled to said second input for attenuating a range of frequencies in said modulation frequencies.

* * * * *